(No Model.) 2 Sheets—Sheet 1.
J. M. DODGE.
CHUTE FOR FEEDING CONVEYERS.
No. 588,900. Patented Aug. 24, 1897.
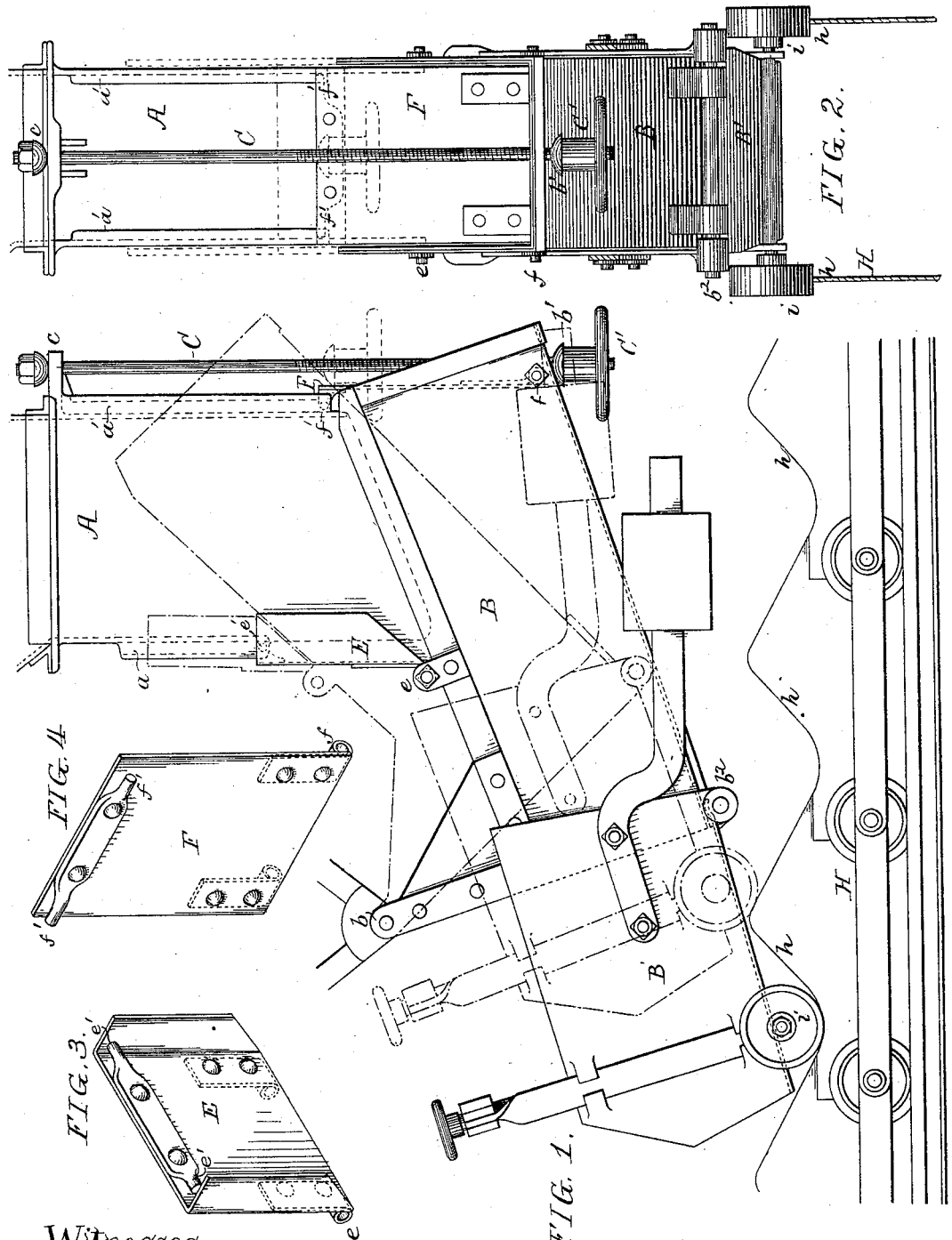
Witnesses.
Will. A. Barr.
Charles DeCou.
Inventor
James M. Dodge
by his attorneys
Howson & Howson (No Model.) 2 Sheets—Sheet 2.

J. M. DODGE.
CHUTE FOR FEEDING CONVEYERS.

No. 588,900. Patented Aug. 24, 1897.

Witnesses.

Inventor —
James M. Dodge
by his attorneys
Howson & Howson

# UNITED STATES PATENT OFFICE.

JAMES M. DODGE, OF PHILADELPHIA, PENNSYLVANIA, ASSIGNOR TO THE LINK-BELT ENGINEERING COMPANY, OF SAME PLACE.

CHUTE FOR FEEDING CONVEYERS.

SPECIFICATION forming part of Letters Patent No. 588,900, dated August 24, 1897.

Application filed June 3, 1897. Serial No. 639,195. (No model.)

*To all whom it may concern:*

Be it known that I, JAMES M. DODGE, a citizen of the United States, residing in Philadelphia, Pennsylvania, have invented certain Improvements in Chutes for Feeding Conveyers, of which the following is a specification.

My invention relates to chutes for feeding conveyers with material having different degrees of specific gravity.

The object of my invention is to so adjust the chute for the particular material with which the conveyer is to be charged that the material will flow through the chute at a given speed. This object I accomplish in the following manner, reference being had to the accompanying drawings, in which—

Figure 6:
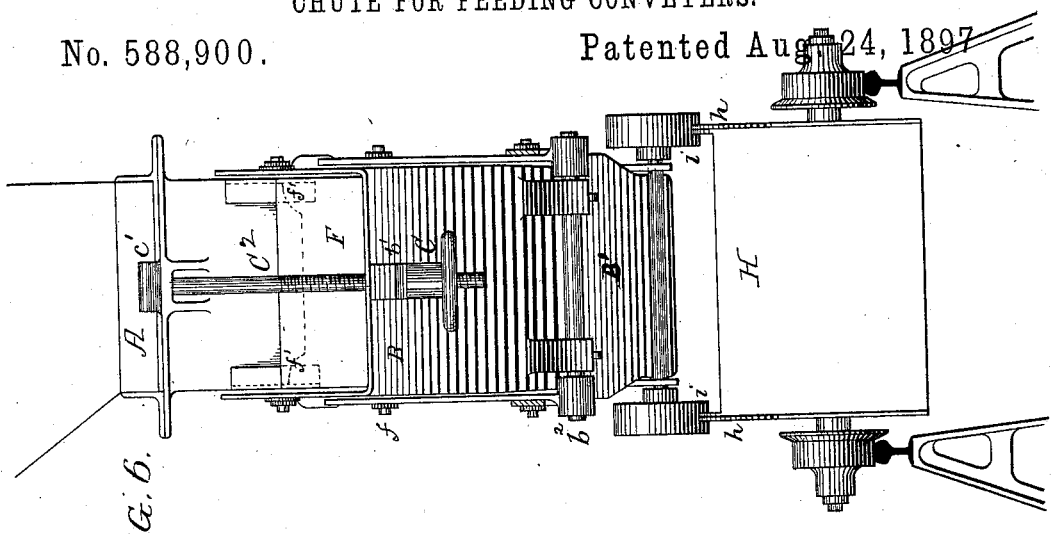
Figure 5:
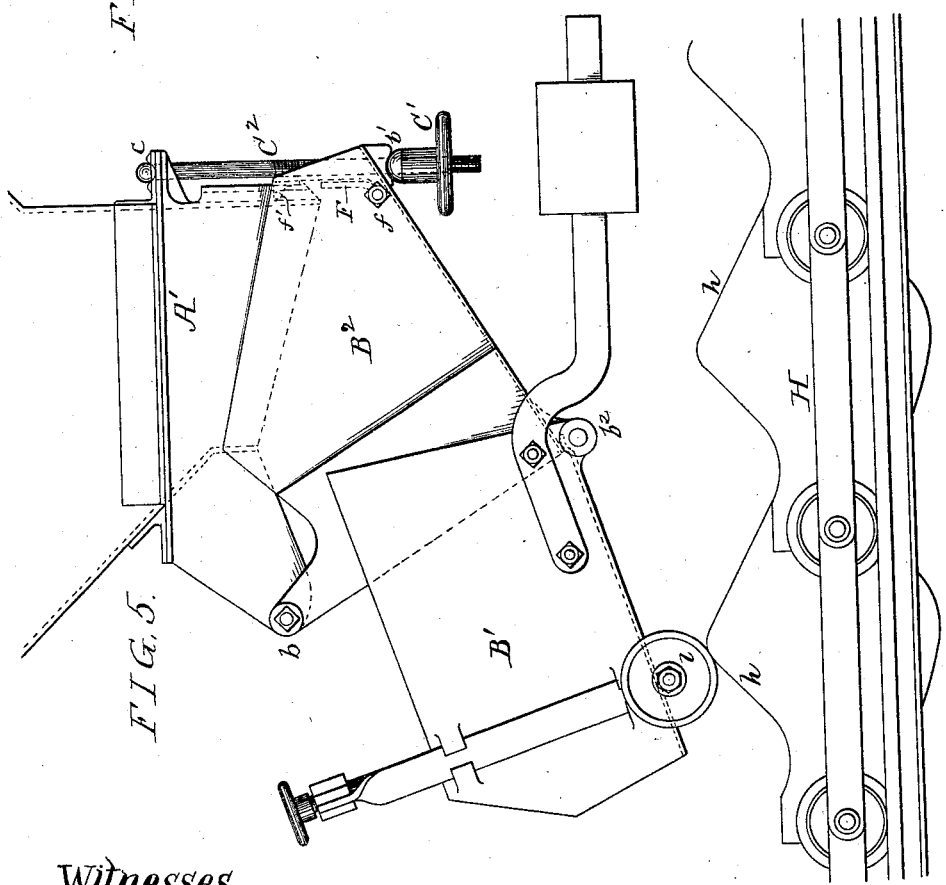

Figure 1 is a side view illustrating my invention, the chute being at the lowest angle, so as to deliver such material as anthracite coal. Fig. 2 is a rear view. Figs. 3 and 4 are detached perspective views of the front and back guard-plates. Fig. 5 is a side view of a modification, and Fig. 6 is a rear view of Fig. 5.

A is a hopper.

B is the chute, pivoted at $b$ to the fixed frame in any suitable manner.

C is an adjusting-screw hung from the hopper at $c$, and on this screw is a handled nut C', which rests in contact with a swivel-block $b'$ on the rear end of the chute.

The lower end of the hopper is cut away, so as to allow the chute to be adjusted to the extreme position shown by dotted lines in Fig. 1, and I provide at the front and rear suitable closing-plates E and F, respectively. The plate E has projections $e'$, adapted to ways $a$ in the front of the hopper and is pivoted to the chute at $e$, while the plate F has projections $f'$, adapted to ways $a'$ in the rear of the hopper and is pivoted at $f$ to the chute, so that the space between the chute and the lower end of the hopper at the back is closed by the back plate F, and the front of the hopper is closed to a point on a line with the upper edge of the chute by the front plate E.

On the outer end of the chute is a pivoted section B', which is pivoted to the main chute at $b^2$, and on this pivoted section are rollers or shoes $i$, which rest upon the edges $h$ of the conveyer-buckets H. Suitable mechanism is provided, so that the rollers or shoes can be adjusted toward or from the pivoted section of the chute, so as to regulate the intermittent feed of the buckets. Any suitable mechanism may be provided to make this adjustment without departing from my invention, which relates particularly to the adjustment of the main chute.

It will be seen that by my invention I can so regulate the chute that easy-flowing material, such as anthracite coal, will flow in an even stream through the chute and will only be checked by the intermittent raising and lowering of the pivoted end section of the chute, and it also can be adjusted to an acute angle, as shown by dotted lines in Fig. 1, so that such difficult material as bituminous coal or wet ashes will flow regularly through the chute, and the flow will only be interrupted by the intermittent movement of the end of the chute.

In Figs. 5 and 6 I have shown a chute $b^2$ considerably contracted, dispensing with the front plate of the hopper A'. This chute is adapted for use where the space between the hopper and conveyer is limited. I have also shown in Figs. 5 and 6 the screw $C^2$, provided with a T-head adapted to a bearing $c'$ on the hopper, and the swivel-block adapted to a socket on the under side of the chute. The construction shown in Figs. 1 and 2 allows for the free swinging of the chute, while the construction shown in Figs. 5 and 6 tends to prevent lateral movement of the chute.

While my invention is especially adapted for use in connection with means for intermittently feeding bucket conveyers with material, it may be used without the pivoted end section and without the conveyer shown, and in some instances it may be used simply to discharge the material from the hopper in an even stream.

I claim as my invention—

1. The combination of a hopper, a chute pivoted at its forward end, and adapted to receive material from the hopper, with adjusting means at the rear of the hopper for changing the incline of the chute, substantially as described.

2. The combination of a hopper, a pivoted chute, a suspended screw, a handled nut on the screw bearing against one end of the chute and by which the chute is adjusted, substantially as described.

3. The combination of the hopper, the pivoted chute, means for adjusting the chute, and a back plate movable with the chute and adapted to close the back of the hopper on the adjustment of the chute, substantially as described.

4. The combination of a hopper, a pivoted chute, means for adjusting the chute, a movable front plate and a movable back plate under the control of the chute so that they will move with it when it is adjusted, substantially as described.

5. The combination of a hopper, a pivoted chute, means for adjusting the chute to change its angle, a pivoted section on the end of the chute, means for adjusting this section in respect to the chute, with a conveyer adapted to travel under the chute and actuate the pivoted end section of the chute so that it will intermittently feed material to the conveyer, substantially as described.

In testimony whereof I have signed my name to this specification in the presence of two subscribing witnesses.

JAMES M. DODGE.

Witnesses:
WILL. A. BARR,
JOS. H. KLEIN.